D. N. MINOR.
Seed-Drills.

No. 145,889.

Patented Dec. 23, 1873.

Witnesses.
Edmund Masson.
John R. Young

Inventor.
David N. Minor, by
Prindle and Russ his Attys

UNITED STATES PATENT OFFICE.

DAVID N. MINOR, OF CHARITON, IOWA.

IMPROVEMENT IN SEED-DRILLS.

Specification forming part of Letters Patent No. 145,889, dated December 23, 1873; application filed June 14, 1873.

*To all whom it may concern:*

Be it known that I, D. N. MINOR, of Chariton, in the county of Appanoose and in the State of Iowa, have invented certain new and useful Improvements in Seed-Drills; and do hereby declare that the following is a full, clear, and exact description thereof, reference being had to the accompanying drawing making a part of this specification, in which—

Figure 1:
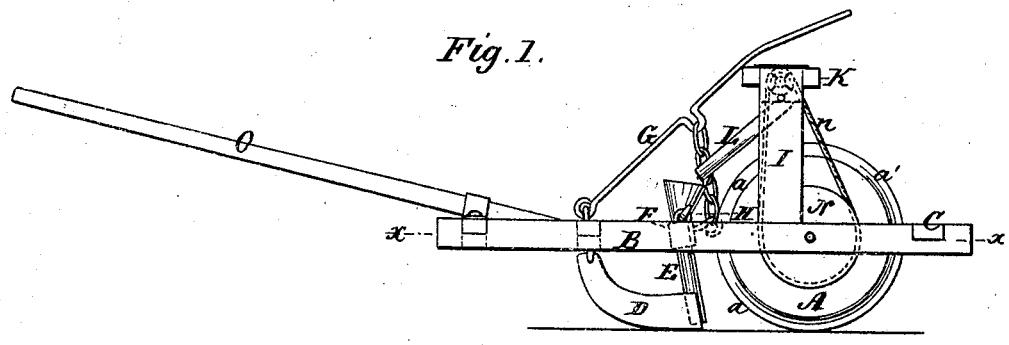
Figure 2:
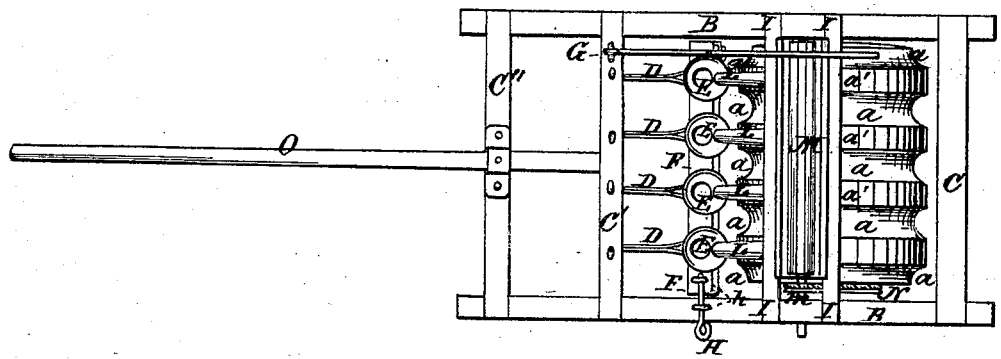
Figure 3:
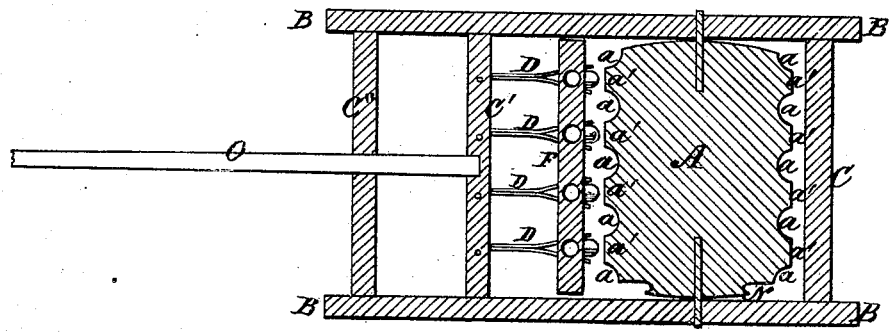

Figure 1 is a side elevation of my improved drill. Fig. 2 is a plan view of the upper side of the same, and Fig. 3 is a horizontal section upon line $x\ x$, of Fig. 1.

Letters of like name and kind refer to like parts in each of the figures.

The object of my invention is to increase the efficiency and improve the operation of a grain-drill; and it consists in so pivoting the frame of the device to, over, and upon the roller that said roller shall afford all the bearing and support for the machine when in operation. It consists, further, in the arrangement and construction of the grooved roller, the frames, the seed-runner, and all the mechanism of the device, whereby an efficient and useful drill is produced.

In the annexed drawing, A represents a roller provided at equidistant points upon its periphery with a number of circumferential grooves, $a$, and journaled within a frame composed of two side rails, B, connected together by means of three cross-bars, C, C', and C'', the second of which bars, C', is placed midway between said roller and the front end of said frame. By thus mounting the said frame to, over, and upon the roller, I cause said roller to constitute the sole support for the frame, and am enabled to dispense with all accessory or supplemental wheels. I thus cheapen the cost of the device, and render its action simpler and surer when being moved to and fro over a field. Hinged to or upon the lower side of the cross-bar C' is a series of runners, D, which are of ordinary construction, are provided at their rear ends with seed-pipes E, and said ends secured in relative position by means of a bar, F, through which said pipes pass. The ends of the runners may be raised or lowered by means of a lever, G, which is pivoted at its forward end to or upon the cross-bar C', and, extending rearward, has its center connected by a chain with one end of the bar F. A bolt, H, passing inward through two staples or keepers, $h$, attached to the upper side of one of the side rails B, and to the corresponding side of the bar F, at the end opposite to the lever G, enables said bar and the runners to be locked in position, vertically. The runners correspond in number and relative position to the portions $a'$ of the roller A, so as to cause grain passing downward through the pipes E to fall directly in the track of said enlargements, which force said grain into the ground, while the grooves $a$ of said roller form corresponding elevations between the rows of grain.

The effect of this arrangement is to more effectually embed the grain within the depressions of the soil, while the ridges left between the rows of grain protect the young plants from the injurious effects of the winds in winter.

Supported upon a suitable frame, I, directly over the rollers A, is a seed-box, K, which, by means of a series of spouts, L, is connected with each seed-pipe, E, so as to permit grain to pass downward into the latter. An agitator, M, is journaled within the seed-box, and caused to rotate by means of a grooved pulley, $m$, which is attached to or upon one end of its shaft, and connected by means of a cord, $n$, to or with a similar pulley, N, attached to the corresponding end of the roller A. A pole, O, connected with and extending forward from the cross-bars C' and C'', completes the device, the operation and advantages of which will be readily understood from the foregoing description.

Having thus fully set forth the nature and merits of my invention, what I claim as new is—

1. The frame B, C, C', and C'', and supporting-frame I, when mounted upon the grooved roller A, in the manner and for the purposes set forth.

2. The frame and the seeding mechanism, when the several parts are combined with each other and are mounted upon the grooved roller A, in the manner and for the purposes set forth.

In testimony that I claim the foregoing I have hereunto set my hand this 12th day of May, 1873.

DAVID N. MINOR.

Witnesses:
GUS. G. MINOR,
E. C. HAYNES.